United States Patent

[11] 3,620,430

[72] Inventors Gerald W. Baumann
Boulder;
Richard E. Norwood, Boulder; William J. Rueger, Longmont, all of Colo.

[21] Appl. No. 16,870
[22] Filed Mar. 5, 1970
[45] Patented Nov. 16, 1971

[73] Assignee International Business Machines Corporation
Armonk, N.Y.

[54] CONSTANT MASS FLOW PRESSURIZED AIR BEARING
8 Claims, 5 Drawing Figs.

[52] U.S. Cl. .......... 226/97
[51] Int. Cl. .......... B65h 17/32
[50] Field of Search .......... 226/95, 97, 7

[56] References Cited

UNITED STATES PATENTS

| | | | |
|---|---|---|---|
| 3,201,985 | 8/1965 | Williams .......... | 226/97 X |
| 3,156,398 | 11/1964 | Lauxen et al. .......... | 226/97 |
| 3,199,800 | 8/1965 | Reader .......... | 226/97 X |
| 3,270,932 | 9/1966 | Smith, Jr. .......... | 226/97 X |
| 3,087,664 | 4/1963 | Streeter .......... | 226/97 |

*Primary Examiner*—Allen N. Knowles
*Attorneys*—Hanifin and Jancin and Francis A. Sirr

ABSTRACT: An air bearing supports the magnetic recording tape of a magnetic tape unit as the tape moves in a curved path, the air bearing having a plenum chamber connected through an orifice to a high-pressure source of air, the pressure magnitude of the source being such that over the operating range of the bearing, the mass rate of air flow into the plenum chamber, and thus out of the bearing to support the tape, is substantially constant.

PATENTED NOV 16 1971 3,620,430

INVENTORS

GERALD W. BAUMANN
RICHARD E. NORWOOD
WILLIAM J RUEGER

BY

ATTORNEY

CONSTANT MASS FLOW PRESSURIZED AIR BEARING

BACKGROUND AND SUMMARY OF THE INVENTION

This invention, while having utility in the general field of the support of a flexible material, will be described in the environment of a magnetic tape unit as is utilized in the computer arts.

In the art of magnetic tape data recording, the magnetic tape must pass over a guide or bearing as the tape curves to change its direction of travel.

Prior art devices utilize fluid bearing structures, such as air bearings, where air, usually under constant pressure, leaves a face of the bearing through small openings to create a layer of air between the tape and the face of the bearing; this layer of air being of a pressure greater than the pressure of the surrounding ambient air. Thus, the tape is supported. These bearings are designed to operate in a region of maximum bearing stiffness, stiffness being defined as the ratio of tape tension variation to the resulting variation in separation of the tape and the adjacent surface of the bearing.

The ability of prior art air bearings to adequately support the tape is restricted to relatively narrow ranges of tape tension variation. As the performance characteristics of magnetic tape units increase, such as an increase in the speed with which the tape bidirectionally moves, and as the tape experiences dynamic reversal in movement, the tape is subjected to a wide range of tape tension, and prior art bearings are unable to provide the required stiffness characteristic. Also, if multiple prior art bearings are connected to a single source of air, the entire system of air bearings may experience instability due to feedback as wide ranges of tape tension at one bearing cause the airflow through that bearing to vary widely. This is particularly true where the tape is moved such that the individual bearings experience different variations in tension at different times.

The present invention provides a structure which maintains relatively constant stiffness or separation between the tape and the adjacent bearing surface or face over wide ranges of tape tension.

The mass rate of fluid flow through the bearing of the present invention is constrained to be of a constant value by means of orifice means which connects the bearing plenum chamber to a source of high-pressure fluid, specifically, air. The critical relationship of the structure restricting flow to pressure magnitude of the source is such that the mass flow of air into the earing plenum chamber is substantially constant and is generally not affected over the operating range of the bearing by variations in plenum pressure as caused by variations in tape tension.

In a multiple bearing system utilizing the invention, the air flow to each bearing is predetermined, and variations in load on one bearing as the tension on its portion of the tape changes does not cause a feedback through the common source of high-pressure air to the other bearings.

The foregoing and other objects, features, and advantages of the invention will be apparent from the following more particular description of a preferred embodiment of the invention, as illustrated in the accompanying drawings.

DESCRIPTION OF THE PREFERRED EMBODIMENT

Figure 1:
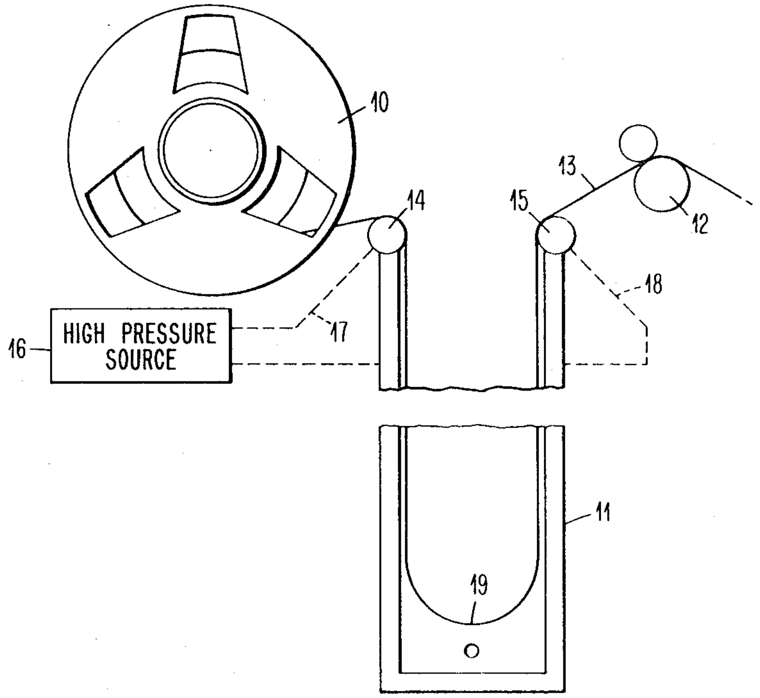
FIG. 1 is a diagrammatic showing of a portion of a magnetic tape unit including a tape storage reel, a vacuum column, a capstan, and two air bearings embodying the present invention.

FIG. 1 discloses a portion of a magnetic tape unit including tape storage reel 10, vacuum column 11, capstan 12, magnetic recording tape 13, and two air bearings 14 and 15 which embody the present invention. The multiple air bearing system of FIG. 1 is supplied from a single high-pressure source 16, the connection of source 16 to individual bearings 14 and 15 being represented by broken lines 17 and 18.

As is well known, tape 13 experiences rapid dynamic reversals in direction under the control of capstan 12. Position sensing means, not shown, associated with vacuum column 11 controls the speed and direction of rotation of tape reel 10 to maintain tape loop 19 at an optimum position within the vacuum column. Thus, the tape is subjected to forces created by movement of reel 10 and capstan 12 as well as by the vacuum within the vacuum column. The tape path of conventional magnetic tape units includes elements, such as the magnetic transducer or head, the tape cleaner, and the capstan which produce a change in tension in the tape as the tape passes over these elements. The air bearings on opposite sides of these elements experience different tape tensions, and as the tape changes direction, the tension in the tape over the bearings changes.

Figure 2:
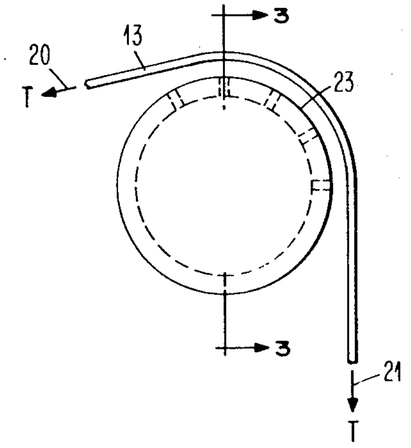
FIG. 2 is an end view of a cylindrical shaped air bearing,embodying the present invention showing a portion of the magnetic tape supported in spaced relationship thereto.

FIG. 2 is an end view of a cylindrically shaped air bearing, such as bearings 14 and 15 of FIG. 1, showing a portion of magnetic tape 13 supported in spaced relationship to the upper surface 23 of the air bearing. Arrows 20 and 21, designated "T," represent the tension in tape 13 tending to force the tape against the upper surface of the air bearing.

Figure 3:
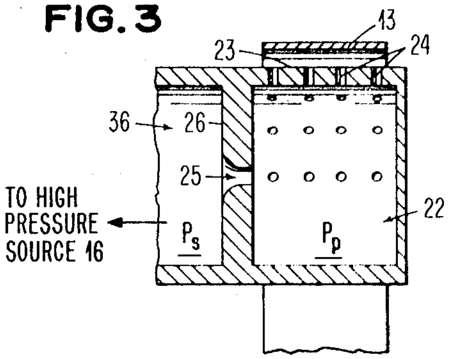
FIG. 3 is a section view of the structure of FIG. 2, taken along the line 3—3.

FIG. 3 is a section view of the air bearing of FIG. 2 taken along the line 3—3. From FIG. 3, it can be seen that the air bearing includes a closed plenum chamber 22 whose upper curved wall 23 includes a plurality of openings 24. Openings 24 can take a variety of forms, and their function is to allow air to flow out of plenum chamber 22 to support tape 13 in spaced relation to surface 23 of the plenum chamber. This spacing has been designated as the spacing "*h*." Orifice means 25 is located in a wall 26 of the plenum chamber; this orifice means being shown as a rounded entrance orifice. The upstream side 36 of orifice means 25 is connected to high-pressure source 16 by means not shown.

The essence of the present invention resides in the concept that the various structural means which restrict flow from high-pressure source 16 are related to the magnitude of the high pressure source such that a substantially constant mass rate of flow is experienced through orifice means 25. More specifically, the pressure magnitude of high pressure source 16, at the upstream side 36 of orifice means 25, designated as "$P_s$,"a is always relatively large compared to the pressure in the the plenum chamber, designated "$P_p$," over the operating range of the tape tensions to be experienced by the air breaking.

Figure 4:
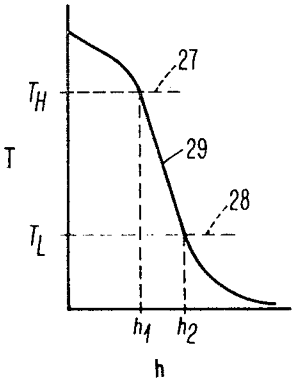
FIG. 4 is a graph showing the relationship of tape tension (T) to tape separation (h) from the face of an air bearing structure embodying the present invention.

With reference to FIG. 4, the characteristics of an air bearing embodying the present invention are disclosed, wherein the range of tape tensions "T" are plotted versus the variation in spacing "*h*" of the tape to the adjacent surface of the air bearing. In FIG. 4, broken line 27 designates the upper range of tape tension to be experienced, and broken line 28 designates the lower range of tape tension. For this range of tape tension, the separation of the tape and the adjacent surface of the air bearing varies between the limits "$h_1$" and "$h_2$."

The present invention, which provides constant flow through orifice means 25, provides a more nearly vertical portion 29 for the curve of FIG. 4 and, thus, allows the bearing to accommodate greater variations in tape tension with a given change ($h_2$-$h_1$) in separation.

Preferably, orifice means 25 of FIG. 3 operates in the choked flow region. Choked flow can be defined by considering orifice means 25 and by stating that if pressure and temperature conditions at the upstream side 36 of orifice means 25 are specified, the mass flow rate through orifice means 25 is accordingly determined by its entrance area, and there is a minimal cross-sectional area in the throat of the orifice which is required to pass this flow. This phenomena is called choking, and may be summarized by saying that for a given area reduction, there is in subsonic flow a maximum initial mach number which can be maintained steadily; and in supersonic flow a minimum initial mach number which can be maintained steadily. At either of these limiting conditions, the flow at the orifice restriction is sonic, and the orifice is said to be choked.

Figure 5:
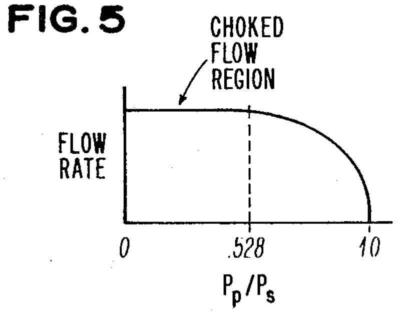
FIG. 5 is a graph showing the flow characteristic of an orifice through which air is flowing, and defines the choked flow

FIG. 5 is a graph which relates the mass rate of air flow through orifice 25 to the ratio of the pressure within plenum chamber 22 to the pressure on the upstream side 36 of orifice means 25. When air is used as the support medium, and the relationship of $P_p$ to $P_s$ is the range of from 0 to 0.528, the orifice is operating in the choked flow region and variations in the pressure within plenum chamber 22, which occur as the tape tension and, thus, the separation "*h*" vary, do not appreciably affect the mass rate of airflow from high-pressure source 16 to plenum chamber 22.

In a tested embodiment of the present invention, an air bearing, having a configuration such as shown in FIGS. 2 and 3, had a diameter of 1.25 inches, and the cross-sectional area of orifice means 25 was one-fourth of the sum of the cross-sectional areas of openings 24. High-pressure source 16 had a pressure magnitude of 62 p.s.i. absolute, and the nominal pressure within plenum chamber 22 was 20 p.s.i. absolute. For this structure, the separation of magnetic tape 13 to surface 23 of the air bearing was nominally 0.001 inch, and the operating range of tape tension varies from between 7 pounds per inch width of the tape to 1.1 pounds per inch width of the tape.

While the invention has been particularly shown and described with reference to a preferred embodiment thereof, it will be understood by those skilled in the art that various changes in form and details may be made therein without departing from the spirit and scope of the invention.

What is claimed is:

1. A fluid bearing for use in supporting a flexible material in a predetermined position, the bearing comprising:
   - a plenum chamber having a wall defining the predetermined position, said wall including a plurality of openings adapted to accommodate fluid flow out of said chamber to support the material in spaced relationship to said wall,
   - flow regulating orifice means formed in said chamber to admit fluid into said chamber, and
   - a high-pressure source of compressible fluid connected to supply fluid to said orifice, the pressure magnitude of said source and the size of said orifice being such that over the operating range of the bearing, the mass rate of flow of fluid into said chamber is substantially constant and is generally independent of the pressure within said plenum chamber.

2. A fluid bearing as defined in claim 1, wherein the size of said orifice means is small relative to the summation of the sizes of the openings in said wall such that a major portion of the pressure of said high-pressure source is dropped across said orifice means, and the mass flow through said orifice means is thus substantially independent of the pressure within said plenum chamber.

3. A fluid bearing as defined in claim 1, for use in supporting a moving flexible web of material in a predetermined curved path, wherein said wall of said plenum chamber is a curved wall defining the predetermined curved path to be followed by the web.

4. A fluid bearing as defined in claim 3, wherein the pressure magnitude of said source is such that said orifice means operates in the choked flow region.

5. A fluid bearing as defined in claim 3, wherein the restriction to fluid flow, as offered by the openings in said curved wall and by said web, is small relative to the restriction to fluid flow as offered by said orifice means.

6. In a magnetic tape unit in which magnetic tape bidirectionally moves in a tortuous path, the improvement comprising:
   - a plurality of gas bearings associated with said tape, each of said gas bearings having a plenum chamber, a wall of which is provided with a plurality of openings adapted to accommodate gas flow out of said chamber to support said tape in spaced relationship to said wall, and flow-regulating orifice means provided gas flow into said chamber, and
   - a common source of high-pressure gas connected to the orifice means of each of said air bearings to supply gas to the plenum chamber of each of said gas bearings, the pressure magnitude of said common source being related to the size of the orifice means of each of said gas bearings such that the mass flow of gas into the plenum chamber of each of said bearings is substantially constant, as determined by the pressure drop across the orifice means of each of said gas bearings.

7. The combination defined in claim 6, wherein restriction to the flow of gas out of each of said plenum chambers as offered by said plurality of openings and by said tape, as said tape is supported in spaced relationship to said openings, is small as compared to the restriction to the flow of gas as offered by the orifice means associated with each of said plenum chambers.

8. The combination defined in claim 6, wherein the pressure magnitude of said common source is such that the orifice means of each of said gas bearings operates in the choked flow region.

* * * * *